A. NEUMANN.
ROTARY ENGINE.
APPLICATION FILED MAY 23, 1909.

936,933.

Patented Oct. 12, 1909.
2 SHEETS—SHEET 1.

Witnesses

Inventor
Arthur Neumann
by Hopkins & Eicks
Attys

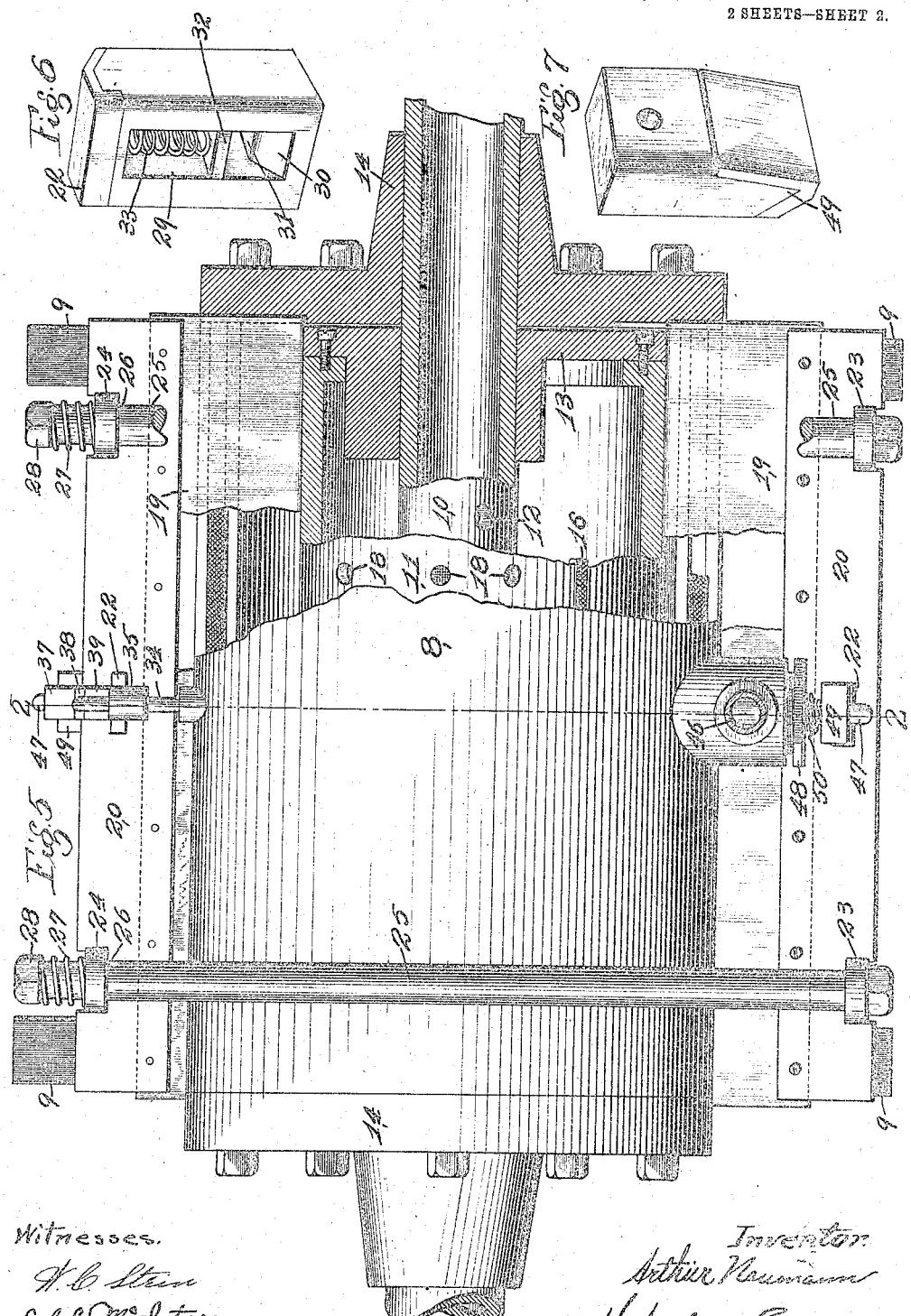

UNITED STATES PATENT OFFICE.

ARTHUR NEUMANN, OF ST. LOUIS, MISSOURI, ASSIGNOR OF ONE-HALF TO DANIEL F. BEHRENS, OF CLAYTON, MISSOURI.

ROTARY ENGINE.

936,933.

Specification of Letters Patent. Patented Oct. 12, 1909.

Application filed May 23, 1908. Serial No. 434,597.

*To all whom it may concern:*

Be it known that I, ARTHUR NEUMANN, a citizen of the United States, and resident of St. Louis, Missouri, have invented certain new and useful Improvements in Rotary Engines, of which the following is a specification.

My invention relates to improvements in rotary engines, and has for its object to provide a rotary engine in which the rotating cylinder is eccentrically mounted upon a hollow shaft, through which hollow shaft the escape of the exhaust steam is effected.

Figure 1:
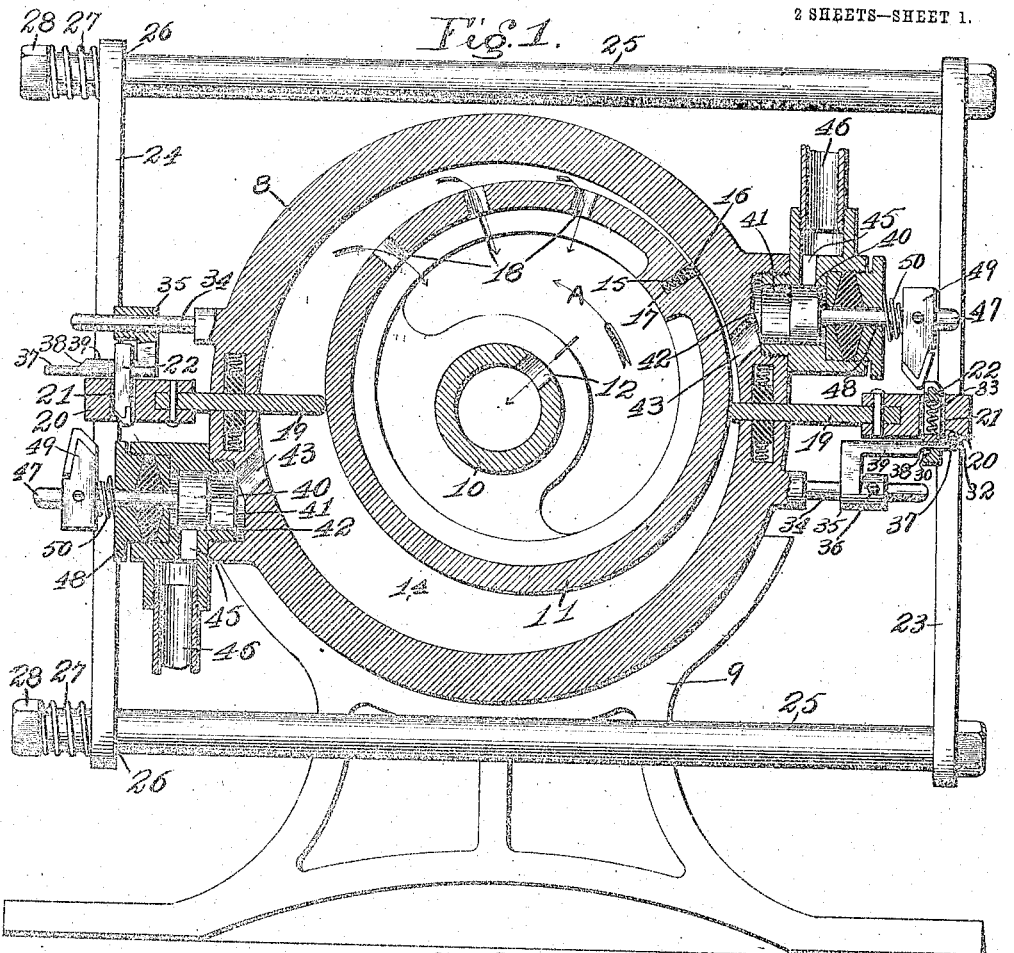
Figures 2, 3, 4:
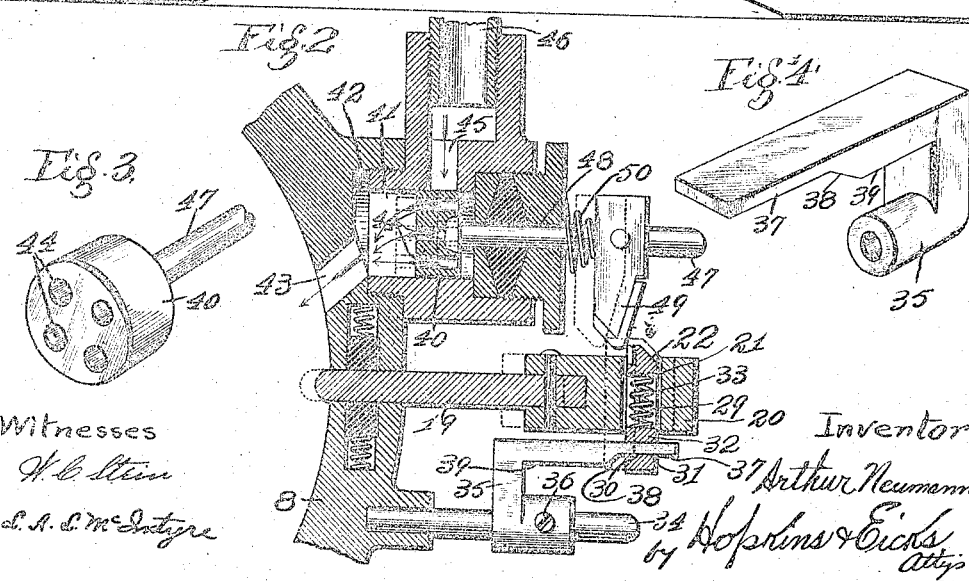

In the drawings—Figure 1 is a central vertical sectional view of a device embodying my invention, taken along the line 2—2 of Fig. 5. Fig. 2 is an enlarged detail sectional view of one of the inlet valves of my invention and its connections. Fig. 3 is an enlarged perspective view of one of the inlet valves. Fig. 4 is an enlarged perspective view of one of the guide-members employed in my invention. Fig. 5 is a top plan view of a device embodying my invention, showing a portion broken away and in section. Fig. 6 is an enlarged perspective view of one of the dogs employed in my invention, and which is mounted upon the guide-member illustrated in Fig. 4. Fig. 7 is an enlarged perspective view of one of the dogs employed in my invention, which is actuated by the dog illustrated in Fig. 6.

As shown in the drawings, I provide an outer cylinder 8 mounted upon the base supports 9. Mounted axially within the cylinder 8 I provide the tubular shaft 10 upon which the rotating cylinder 11 is eccentrically mounted; the tubular shaft 10 being provided with perforations 12 and being fixed through the inner cylinder heads 13 and journaled in the outer cylinder heads 14. The rotating cylinder is provided with a longitudinal slot 15 throughout the length of its outer face, wherein the follower 16 is mounted, and is kept in contact with the inner face of the cylinder 8 by means of the coil-spring 17. At a point beyond the follower 16, with reference to the line of travel of the rotating cylinder 11, indicated by the arrow A in Fig. 1, the cylinder 11 is provided with perforations 18.

In each wall of the cylinder 8 and midway of its height, I provide a slide valve 19 whose outer end is provided with the blocks 20 having a vertical slot 21 through which the dog 22 is mounted. The blocks 20 are carried by upright members 23 and 24; the upright members 23 are fixedly secured at the outer ends of the cross-bars 25—25, while the uprights 24 are loosely mounted on the ends 26 of the cross-bars 25—25, and are to keep the valves 19 in close contact with the cylinder by means of the coil-springs 27—27, whose outer ends are secured upon the cross-bars 25—25 by means of nuts 28—28 screw-threaded on said cross-bars 25—25.

The dogs 22—22 are constructed as illustrated in the perspective view in Fig. 6 and in section in Fig. 2; each of said dogs being provided with the slot 29, the bottom of said slot being formed with an inclined face 30 leading to the horizontal bearing surface 31. A block 32 is slidably mounted in the slot 29 and the coil-spring 33 is mounted within the wall 29 and above the block 32. Above the slide valve 19 on one side of the cylinder 8, and below the slide valve 19 on the opposite side of the cylinder 8, I provide projecting pins 34—34 upon which the guide-members 35—35 are secured by means of screws 36, the guide-members 35 being of the form illustrated in Fig. 4; having a projecting flattened end 37, an inclined shoulder 38 and an inner thicker portion 39.

The function of the dogs 22—22 and their connections is to control the operation of the inlet valves 40—40, which valves 40—40 are slidably mounted in housings 41—41, communicating with the recesses 42—42 with which the outer cylinder 8 is provided, inlet openings 43—43 extending from the recesses 42—42 to the interior of the cylinder 8. The valves 40—40 are constructed as illustrated in Fig. 3, having perforations 44 extending through them, through which steam is admitted from the opening 45 with which the pipe 46 is connected, the admission of steam from the pipe 46 being effected upon the inward stroke of the valves 40—40. The valves 40—40 are mounted upon pins 47—47 which are slidably mounted in the housings 48 and are provided with the dogs 49, coil-springs 50 being interposed between the inner faces of the dogs 49 and the outer faces of the housings 48.

The mode of operation of the machine thus described is as follows: Steam being admitted through either of the ports 43, the inner cylinder 11 is driven in the direction indicated by the arrow A in Fig. 1, by reason of the steam so admitted in the cavity existing between the outer wall of the shoulder 11, the inner wall of the cylinder 8, the face of the slide valve 9, and the face of the follower 16. As the cylinder 11 travels sufficiently to carry the follower 16 and the guides 19 to the opposite guide 19, the port 43 last passed by the follower 16 will be closed by reason of the inlet valve 40 being carried to a point which will close the mouth of the inlet opening 45; and the follower 16 having been carried beyond the valve 19 to which it has thus been conveyed, the port 43 which it passed will be opened by the corresponding movement of the valve 40 whereby said port 43 is controlled. The exhaust steam, accumulated in front of the follower 16 with reference to the line of travel of the cylinder 11, will be discharged inwardly, to the interior of the cylinder 11 through the openings 18, and thence through the opening 12 into the interior of the tubular shaft 10, finding its final exit through the ends of the said tubular shaft.

Having thus fully described my invention, what I claim as new and desire to have secured to me by the grant of Letters Patent, is:

1. In a rotary engine, a stationary outer cylinder; a tubular shaft axially journaled therein; a revoluble cylinder eccentrically mounted upon said tubular shaft, with its outer face contacting with the inner face of the stationary cylinder; a follower interposed between the outer face of the revoluble cylinder and the inner face of the stationary cylinder; the revoluble cylinder and the tubular shaft being provided with perforations for the emission of the exhaust steam from the interior of the stationary cylinder; slide valves mounted through the stationary cylinder and contacting with the outer face of the revoluble cylinder; valves mounted in the wall of the stationary cylinder, and means whereby said valves are successively operated to control the admission of steam to the interior of the stationary cylinder, substantially as described.

2. In a rotary engine, the combination of a stationary cylinder provided with steam inlet openings; a tubular shaft journaled axially therein; a revoluble cylinder mounted eccentrically upon said tubular shaft; a longitudinal follower mounted in the outer face of the revoluble cylinder and contacting with the inner face of the stationary cylinder; slide valves longitudinally mounted through the outer cylinder; steam inlet valves whereby the steam inlet openings in the stationary cylinder are controlled, and means connecting said sliding valves and said steam inlet valves whereby said steam inlet valves are successively operated; the revoluble cylinder and the tubular shaft being perforated to provide for the escape of the exhaust steam, substantially as described.

In testimony whereof, I have signed my name to this specification, in presence of two subscribing witnesses.

ARTHUR NEUMANN.

Witnesses:
ALFRED A. EICKS,
WALTER C. STEIN.